United States Patent [19]

Shain

[11] Patent Number: 4,708,975

[45] Date of Patent: * Nov. 24, 1987

[54] LOW SMOKE GENERATING, HIGH CHAR FORMING, FLAME RETARDANT THERMOPLASTIC MULTI-BLOCK COPOLYESTERS

[75] Inventor: Albert L. Shain, Wilmington, Del.

[73] Assignee: E. I. Du Pont de Nemours and Company, Wilmington, Del.

[*] Notice: The portion of the term of this patent subsequent to Apr. 15, 2003 has been disclaimed.

[21] Appl. No.: 847,190

[22] Filed: Apr. 2, 1986

[51] Int. Cl.[4] .......................... C08K 3/34; C08K 3/26; C08K 3/22

[52] U.S. Cl. ....................................... 523/216; 524/94; 524/412; 524/425; 524/430; 524/437

[58] Field of Search ................. 524/94, 425, 430, 412, 524/437, 156; 523/216

[56] References Cited

U.S. PATENT DOCUMENTS

| | | | |
|---|---|---|---|
| 4,251,430 | 2/1981 | Kennedy-Skipton et al. | 525/15 |
| 4,311,635 | 1/1982 | Pearson | 524/430 |
| 4,373,039 | 2/1983 | Mueller et al. | 524/437 |
| 4,383,071 | 5/1983 | Lawson et al. | 524/437 |
| 4,521,557 | 6/1985 | McKenna | 524/94 |
| 4,582,866 | 4/1986 | Shain | 524/94 |

FOREIGN PATENT DOCUMENTS

| | | |
|---|---|---|
| 1116797 | 1/1982 | Canada . |
| 50-109945 | 8/1975 | Japan . |
| 57-18744 | 1/1982 | Japan . |
| 2130223 | 5/1984 | United Kingdom . |

Primary Examiner—Lewis T. Jacobs

[57] ABSTRACT

Flame retardant thermoplastic multi-block copolyester compositions containing a bromine or chlorine containing flame retardant; antimony trioxide; an organophilic clay which is the reaction product of at least one quaternary ammonium salt with a smectite clay fumed or colloidal silica or polytetrafluoroethylene; 5–100 parts per 100 parts multi-block copolyester of alumina trihydrate and up to about 100 parts per 100 parts multi-block copolyester of calcium carbonate.

15 Claims, No Drawings

LOW SMOKE GENERATING, HIGH CHAR FORMING, FLAME RETARDANT THERMOPLASTIC MULTI-BLOCK COPOLYESTERS

BACKGROUND OF THE INVENTION

Thermoplastic copolyester elastomers have gained acceptance in many fields because of their outstanding physical properties which are unique in relation to other thermoplastic polymers. However, copolyester elastomers are flammable and this limits their usefulness for preparing electrical parts, wire coverings for telecommunications, optical fiber outer jacketing and other applications where fire retardant materials are needed.

Numerous halogenated organic compounds either alone or in combination with antimony trioxide have been tested or even recommended for use in polyester homopolymers or random copolyesters. Because of the relatively high flammability of multi-block copolyesters, the ease with which such copolyesters undergo degradation during melt processing, and the difficulty of retaining a useful amount of flexibility in the multi-block copolyesters in the presence of significant amounts of added materials, there still is a need for fully acceptable fire retardant multi-block copolyester compositions that are low smoke generating, high char forming and substantially nondripping when burned. The present invention provides flame retardant multi-block copolyester compositions which do not exhibit enhanced degradation and which substantially retain a useful amount of the flexibility of the starting polymer. Moreover, and most importantly, these flame retardant compositions are low smoke generating, high char forming and substantially nondripping when burned.

Recently, substantially nondripping flame retardant copolyesters have been developed by adding to the copolyester a combination of a flame retardant to resist burning and the drip suppressant fumed colloidal silica or an organophilic clay which is the reaction product of at least one quaternary ammonium salt with smectite clay. Such flame retardant, drip suppressant copolyester compositions are described in U.S. Pat. No. 4,521,557 to McKenna dated June 4, 1985 and U.S. application Ser. No. 605,550 to Shain filed Apr. 30, 1984, both assigned to E. I. du Pont de Nemours and Company. These flame retardant, substantially nondripping copolyester compositions referred to above are quite useful especially for coverings on optical fibers and wire since they are substantially nondripping when burned. However, the flame retardant nondripping multi-block copolyester compositions generate considerable amounts of smoke and only small amounts of char when they are burned. For many uses, for example plenum cable covering, the compositions should not only be flame retardant when burned but also generate minimum amounts of smoke which, of course, presents a serious hazard during a fire and causes secondary damage over a large area of the building. Further, the compositions should have high char formation. High char formation is beneficial because the char has enough integrity to remain in place, for example, on a bundle of wires, and functions as an insulator. The char keeps some of the heat of the external fire away from the wire bundle, minimizing its contribution to the flame and maximizing the length of time during which the wires perform their normal function. Many compositions have been rejected by manufacturers because of the large amounts of smoke generated and small amounts of char formation by the polymers when burned.

The present invention is directed to a novel copolyester composition that is especially useful for covering bundles of insulated telecommunication wires, e.g., optical fibers, with a flame-protective jacket material, the copolyester compositions of this invention, which are not only flame retardant and substantially nondripping but, in addition, such compositions have low smoke generating characteristics together with high char formation. The copolyester compositions of this invention can be made low smoke generating by the addition of a small amount of a char forming additive, and can do so without intumescing into a ceramic barrier.

SUMMARY OF THE INVENTION

The present invention provides a substantially nondripping, low smoke generating, high char forming, flame retardant thermoplastic copolyester composition which comprises (a) a multi-block copolyester of film forming molecular weight consisting essentially of (A) repeating high melting point blocks comprising repeating short chain ester units having the formula

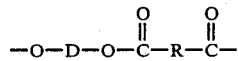

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting point blocks which are derived from compounds containing hydroxyl groups or carboxyl groups or mixtures thereof having a number average molecular weight of 400–4000 and a melting point not greater than about 100° C., and (C) an amount of difunctional radicals sufficient to join repeating blocks (A) and (B) to form a multi-block copolyester, the weight ratio of (A) to (B) being from about 1:0.12 to 1:4

(b) about 5–35 parts per 100 parts of said multi-block copolyester of a bromine- or chlorine-containing flame retardant containing at least 50% by weight bromine or chlorine, (c) about 0.20–1.5 parts per part of said bromine- or chlorine-containing flame retardant of antimony trioxide, and (d) a drip suppressant selected from (1) at least about 1 part per 100 parts of said multi-block copolyester of an organophilic clay which is the reaction product of at least one quaternary ammonium salt with a smectite clay having an ion exchange capacity of at least 75 meq/100 g of clay, said quaternary ammonium salts having the formula

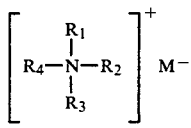

wherein M⁻ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1–22 carbon atoms in the alkyl chain, (2) at least 2 parts per 100 parts of said multi-block copolyester of fumed colloidal silica, (3) at least about 0.2 parts per 100 parts of said multi-block copolyester of polytetrafluoroethylene, (e) about 5–100 parts per 100 parts of said multi-block copolyester of alumina trihydrate and, (f) up to about 100 parts per 100 parts multi-block copolyester of calcium carbonate, with the proviso that the total amount of (e) and (f) is less than about 140 parts per 100 parts multi-block copolyester.

The compositions of the present invention are readily processible by conventional rubber extrusion techniques and are especially useful for plenum cable jacketing for telecommunication wires and optical fibers due principally to low smoke generation and high char formation when burned.

DETAILED DESCRIPTION OF THE INVENTION

The novel low smoke generating, high char forming, flame retardant thermoplastic multi-block copolyester compositions have incorporated therein effective amounts of bromine- or chlorine-containing flame retardants; antimony trioxide; an organophilic clay, or fumed colloidal silica, or polytetrafluoroethylene, usually having particle sizes less than 200 microns; and a small amount of alumina trihydrate and, optionally, calcium carbonate. The alumina trihydrate alone or the combination of alumina trihydrate and calcium carbonate results in a substantially nondripping flame retardant copolyester composition that retains a useful amount of elongation and flexibility and, most importantly, the composition when burned generates a low percentage of smoke and high char formation when compared to similar composition without the alumina trihydrate.

The thermoplastic multi-block copolyesters useful in this invention consist essentially of repeating blocks of repeating short chain ester units, as described above, which have high melting points (at least 150° C.) and repeating low melting point blocks (not greater than 100° C.) which have a number average molecular weight of about 400–4000. The low melting point and high melting point blocks are joined together by difunctional radicals which, for example, can be derived by reaction of the high or low melting point blocks with diols, dicarboxylic acids, diepoxides or diisocyanates. The high melting blocks crystallize at useful service temperatures to provide physical crosslinks in the multi-block elastomer while the low melting blocks provide elastomeric characteristics. At processing temperatures, generally of the order of about 150°–250° C., the high melting point blocks melt and the molten polymer may be processed as a thermoplastic.

The high melting point blocks which comprise repeating short chain ester units of the formula

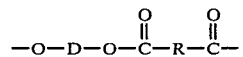

are derived from one or more low molecular weight diols, HODOH, having a molecular weight not greater than 250 and one or more dicarboxylic acids, HOOCR-COOH, having a molecular weight of not greater than 300.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2–15 carbon atoms are preferred, such as ethylene, propylene, tetramethylene, pentamethylene, 2,2-dimethyltrimethylene, hexamethylene, and decamethylene glycols, dihydroxy cyclohexane and cyclohexane dimethanol. Unsaturated diols such as butene-2-diol-1,4 can also be used, particularly in minor amounts in admixture with butanediol-1,4.

The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid anhydrides. The molecular weight requirement pertains to the acid and not to its equivalent ester or ester-forming derivative.

Both aliphatic dicarboxylic acids, such as cyclohexane dicarboxylic acid, and aromatic dicarboxylic acids can be used, preferably aromatic dicarboxylic acids are employed. Among the aromatic dicarboxylic acids for preparing the copolyester polymers are those with 8–16 carbon atoms are preferred, particularly the phenylene dicarboxylic acids, i.e., phthalic, terephthalic and isophthalic acids and their dimethyl esters.

The diol and dicarboxylic acid must be chosen to provide a melting point of at least 150° C. for a polymer having a number average molecular weight of at least 5000 and being derived exclusively from short chain ester units. Preferred high melting point blocks are derived from ethylene glycol or 1,4-butanediol by reaction with terephthalic acid alone or in admixture with up to about 30% by weight isophthalic acid or phthalic acid or mixtures thereof. Polymers based on 1,4-butanediol are especially preferred.

The low melting point blocks in said multi-block copolyesters can be provided by a variety of compounds having number average molecular weights of 400–4000 which contain hydroxyl groups or carboxyl groups or mixtures thereof. Suitable compounds for forming low melting blocks include poly(alkylene oxide) glycols, polyoxyalkylene diimide diacids, low melting polyester glycols and hydrocarbon glycols or diacids.

Representative poly(alkylene oxide) glycols have a carbon-to-oxygen atomic ratio of about 2.0–4.3 and a number average molecular weight of about 400–4000 and include poly(ethylene oxide) glycol, poly(1,2- and 1,3-propylene oxide) glycol, poly(tetramethylene oxide)

glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylene oxide) glycol having a number average molecular weight of 600–1600, especially 800–1200, and ethylene oxide-capped poly(propylene oxide) glycol having a number average molecular weight of 1500–2800 and an ethylene oxide content of 15–35% by weight.

Polyoxyalkylene diimide diacids suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxylalkylene diamine.

In general, the polyoxyalkylene diimide diacids useful herein may be characterized by the following formula:

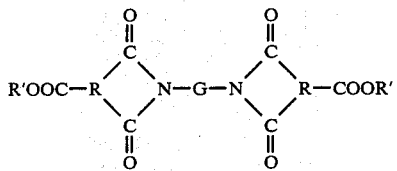

wherein each R is independently a trivalen organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) hydroxy groups of a long chain ether glycol having an average molecular weight of from about 600 to about 12000, preferably from about 900 to about 4000, and a carbon-to-oxygen ratio of from about 1.8 to about 4.3.

The required low melting (i.e., below about 100° C.) polyester glycols are either polylactones or the reaction products of low molecular weight diols (i.e., less than about 250) and an aliphatic dicarboxylic acid. Representative low melting polyester glycols are obtained by reaction of diols such as ethylene glycol, 1,4-butanediol, pentanediol, hexanediol, 2,2-dimethyl-1,3-propanediol and mixtures of ethylene glycol and propylene glycol with diacids such as adipic acid, glutaric acid, pimelic acid, suberic acid and isosebacic acid. Polylactone glycols derived from unsubstituted and substituted caprolactone or butyrolactone are also useful as low melting polyester glycols. Preferred polyester glycols include polycaprolactone glycol and poly(tetramethylene adipate) glycol having number average molecular weights of 800–2500.

Representative hydrocarbon glycol or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols and polyoxyalkylene diimide diacids to provide low melting point blocks.

The multi-block copolyester described herein of film forming molecular weight can be made by procedures known in the art. Copolyesters in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing copolyesters by ester interchange involves heating a dicarboxylic acid or its methyl ester with a poly(alkylene oxide) glycol or hydrocarbon glycol (or diacid or mixtures thereof) and a molar excess of low molecular weight diol in the presence of a catalyst at about 150°–260° C. and a pressure of 0.05 to 0.5 MPa, usually ambient pressure, while distilling off water formed by esterification and/or methanol formed by ester interchange. The glycol or the diacid that provide the low melting point blocks are incorporated into the polymer through difunctional radicals provided by the dicarboxylic acid in the case of the glycols, or by the low molecular weight diols in the case of the diacids. The particular amount of difunctional radicals incorporated into the polymer will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight multi-block copolyester by distillation of the excess of short-chain diol. The second process stage is known as "polycondensation".

Additional ester interchange occurs during this polycondensation which serves to increase the molecular weight of the polymer. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in an amount of about 0.005 to 2.0 percent by weight based on total reactants.

Batch or continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multiblock copolyesters wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate). Ester exchange at first causes the introduction of blocks of one polyester in the other polyester chain and vice versa. When the desired multi-block polymer structure is formed the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate as described in European Patent 0013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks, splitting out caprolactam and joining the blocks through ester linkages. This coupling method is described in Japanese Pat. No. 700740 (Japanese Patent Publication No. 73/4115). Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerizes on the hydroxyl groups of the high melting point ester block which groups serve as initiators. The resulting product is a segmented polymer having high melting point blocks alternating with low melting point polycaprolactone blocks. The segmented polymer is hydroxyl terminated and may be chain extended to give high molecular weight products by reaction with a diepoxide such as diethylene glycol diglycidyl ether, see Japanese Patent Publication No. 83/162654.

The flame retardance of the compositions of this invention is provided by a combination of a bromine- or chlorine-containing flame retardant and antimony trioxide. The flame retardant is used in the present compositions in amounts of about 5-35 parts per hundred parts of multi-block copolyester, preferably 24-30 parts per hundred parts of multi-block copolyester. Any bromine- or chlorine-containing flame retardant which has a bromine or chlorine content of at least 50% by weight and that, preferably, exhibits a weight loss not greater than 5% at 200° C. as determined by thermogravimetric analysis in air at a heating rate of 10° C./minute can be used. These parameters insure that the flame retardant will be effective in the amounts specified and that the flame retardant will not volatilize or degrade during processing. Preferably, the flame retardant added to the copolyester composition is free of functional groups that form ester linkages. Representative bromine-containing flame retardants include decabromodiphenyl ether, octabromodiphenyl ether, tetrabromophthalic anhydride, bis(tribromophenoxy)ethane, bis(pentabromophenoxy)ethane, hexabromocyclododecane and N,N'-ethylenebis(tetrabromophthalimide). Of these N,N'-ethylenebis(tetrabromophthalimide) is especially preferred because of its high melting point, good stability and resistance to blooming. The flame retardant, N,N'-ethylenebis(tetrabromophthalimide), can be prepared by reacting 2 moles of tetrabromophthalic anhydride with 1 mole of ethylene diamine in a suitable solvent such as N-methyl-2-pyrrolidone at about 200° C., as described in U.S. Pat. No. 4,374,220. Preferably, the diimide should be in finely divided form, usually having particles of about 2 micrometers average particle size, when added to the copolyester composition. Representative chlorine-containing flame retardants include various chlorinated paraffins and chlorinated cycloaliphatic compounds including hexachlorocyclopentadiene, chlorendic acid, chloroalcohols have 6-12 carbon atoms, pentaerythritol chlorohydrin, chlorinated alkylaryl ether, chlorostyrenes, chlorobiphenyls, chlorinated 4,4'-bis-hydroxybiphenyl, chlorinated naphthalenes, chlorinated bisphenol A and glycidyl ethers and tetrachlorophthalic acid.

The antimony trioxide, optionally containing small amounts of antimony pentoxide, is incorporated in the multi-block copolyester in an amount of about 0.20-1.5 parts, preferably about 0.3-0.6 parts, per part of bromine- or chlorine-containing flame retardant. Any of the commercially available sources of antimony trioxide can be used in the copolyester composition. It is convenient to use a small particle size, for example, 0.2-0.25 micrometers.

In order to minimize or eliminate dripping when exposed to a flame, the multi-block copolyester compositions contain a drip suppressant that is an organophilic clay, fumed colloidal silica or polytetrafluoroethylene. In all cases it is convenient to use a small particle size, for example, less than about 200 microns.

The organophilic clay is present in the copolyester compositions in an amount of at least about 1, preferably about 2-10 parts, most preferably 3-7 parts, per 100 parts of the multi-block copolyester. The organophilic clay used is the reaction product of at least one quaternary ammonium salt with a smectite-type clay having an ion exchange capacity of at least 75 meq/100 g of clay, said quaternary ammonium salts having the formula

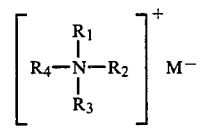

wherein M⁻ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1-22 carbon atoms in the alkyl chain.

Smectite-type clays which are useful in preparing the required organophilic clays include bentonite, montmorillonite, hectorite and saponite clays with bentonite and hectorite clays being preferred. The clays should have an ion exchange capacity of at least 75 meq/100 g of clay and preferably at least 95 meq/100 g of clay. Useful quaternary ammonium salts for modifying the clay by ion exchange must contain a cation having at least one long chain alkyl substituent having 12 to 22 carbon atoms. For reasons of economy most commercially available useful quaternary ammonium salts have one or more alkyl groups derived from hydrogenated tallow which is principally an octadecyl group. The preferred anion is the chloride ion. Representative quaternary ammonium salts which are useful in preparing the organophilic clays required by the present invention include methyl benzyl di(hydrogenated tallow) ammonium chloride, dimethyl benzyl (hydrogenated tallow) ammonium chloride, dimethyl di(hydrogenated tallow) ammonium chloride, methyl tri(hydrogenated tallow) ammonium chloride, and benzyl tri(hydrogenated tallow) ammonium chloride.

An especially preferred clay is bentonite treated with a mixture of 10-90% by weight dimethyl benzyl (hydrogenated tallow) ammonium chloride and dimethyl di(hydrogenated tallow) ammonium chloride.

The multi-block copolyester composition can contain at least about 2 parts, preferably about 3-20 parts, most preferably 3-8 parts, per 100 parts of copolyester, of the drip suppressant fumed colloidal silica. Usually, the drip suppressant has a mean particle diameter of less than 500, most preferably less than 100, millimicrons.

The multi-block copolyester composition can contain at least about 0.2 parts, preferably 0.2-2 parts, most preferably 0.2-1 parts, per 100 parts multi-block copolyester of polytetrafluoroethylene as an effective drip suppressant. The polytetrafluoroethylene is usually a fine powder.

To prevent the generation of large quantities of smoke from the burned copolyester composition and to promote the formation of char it is necessary to add to the copolyester alumina trihydrate in amounts of about 5-100 parts, preferably 5-60 parts, per 100 parts of the multi-block copolyester. Optionally and preferably, up to about 100 parts, preferably 5-60 parts, calcium carbonate per 100 parts multi-block copolyester can be added to the composition. The addition of calcium carbonate aids in high temperature smoke reduction and char generation. If the combination of alumina trihydrate and calcium carbonate is used then the total amount of the alumina trihydrate and the calcium carbonate is less than about 140 parts, preferably less than about 80 parts, per 100 parts multi-block copolyester. It appears that the alumina trihydrate and calcium carbonate act synergestically to substantially reduce the amount of smoke generated from the copolyester, while, at the same time, significantly increasing char formation. Smoke generation can be reduced generally from about 6-15 to 2-10% by volume and char formation increased from about 1-12% to 14-42% as measured by the Arapahoe Smoke Chamber and Char Test, described herein.

Not only do compositions of the present invention give V-O flammability ratings in the modified UL-94 test of Underwriters Laboratories Inc., described herein, and show reduced smoke and increased char in the Arapahoe Smoke Chamber and Char Test, but in Steiner Tunnel Tests (UL-910), a cable bundle jacketed with the composition passed all phases of the test.

Any method which provides uniform mixing of the additives with the copolyester can be used to prepare the compositions of this invention. A preferred procedure involves dry blending all of the ingredients together followed by melt blending of the dry blend in single or twin screw extruder-mixers or internal mixers such as the Farrell Continuous Mixer (FCM) at a temperature above the melting point of the copolyester. The compositions can also be made by adding the flame retardant, antimony trioxide, drip-suppressant, e.g., organophilic clay, alumina trihydrate, and optionally calcium carbonate to the molten copolyester in a batch mixer or agitated vessel. The solid ingredients can be added separately in any order or may be dry blended prior to addition to the molten copolyester if desired.

Another convenient procedure for preparing the compositions of this invention makes use of a concentrated masterbatch of flame retardant, antimony trioxide, drip suppressant, alumina trihydrate and calcium carbonate bound together by a minor amount of copolyester. Usually the concentrated masterbatch contains 15 to 35 percent by weight of copolyester which serves to bind the additive ingredients into pellets. The pellets of concentrated additive ingredients can be dry blended with pellets of unaltered copolyester and the pellet blend can in turn be fed directly to an injection molding machine or extruder to form flame retardant, low smoke generating, high char forming finished articles directly. The required concentrates can be prepared by mixing procedures such as those described hereinbefore.

It is usually desirable to stabilize the copolyester compositions of this invention against heat and/or light. Antioxidants such as hindered phenols or aryl amines are effective for this purpose. Mixtures of these antioxidants with esters of thiodipropionic acid, mercaptides, phosphite esters and the like are useful. Stabilization against light can be obtained by compounding with UV-absorbers and/or hindered amine photostabilizers. The use of these various agents in copolyesters is known to those skilled in the art. In addition to these additives, one can add minor amounts of fillers and colorants as desired and processing aids, such as stearic acid.

The compositions of this invention can be readily processed by a variety of techniques such as injection molding, compression molding and extrusion. Extrusion techniques are used for making cable jackets.

EXAMPLES

In the following examples, which further illustrate the present invention, parts and percentages are by weight unless otherwise indicated.

Copolyester A is prepared according to the following procedure: To a flask fitted with a distillation column and a stainless steel stirrer with a paddle cut to conform with the internal radius of the flask and positioned about 3mm from the bottom of the flask, the following starting materials are charged:

| | |
|---|---|
| dimethyl terephthalate | 62 parts |
| dimethyl isophthalate | 18 parts |
| poly(tetramethylene oxide) glycol (number average molecular weight 1000) | 70 parts |
| 1,4-butanediol | 50 parts |
| N,N'—hexamethylenebis(3,5-di-tert-butyl-4-hydroxy-hydrocinnamamide) | 0.23 parts |
| N,N'—trimethylenebis(3,5-di-tert-butyl-4-hydroxy-hydrocinnamamide) | 0.23 parts |

The flask is placed in an oil bath at 160° C., agitated for five minutes and then 0.3 parts of tetrabutyl titanate is added. Methanol distills from the reaction mixture as the temperature is slowly raised to 250° C. over a period of one hour. When the temperature reaches 250° C., the pressure is gradually reduced to about 270 Pa within 20 minutes. The polymerization mass is agitated at 250° C. for 55–90 minutes. The condensation polymerization is discontinued by releasing the vacuum under nitrogen and the resulting viscous molten product is scraped from the flask in a nitrogen (water and oxygen free) atmosphere and allowed to cool. The resulting polymer has a melt index of 5.4 g/10 min, measured at 190° C. After shredding, the polymer is extruded at 200° C. to a 3–4mm strand and cut into pellets 4–5mm long. The weight ratio of high melting point blocks to low melting point blocks in this polymer is 1:0.92.

Copolyester B is a polymer containing high melting poly(butylene terephthalate) blocks and low melting poly(epsilon-caprolactone) blocks in a weight ratio of 1:0.74, modified with about 3% by weight diethylene glycol diglycidylether. The polymer has a melt index of 5.2 g/10 minutes at 220° C. and prepared as described in column 7, lines 50–59 of U.S. Pat. No. 4,500,686.

Copolyester C is prepared by the procedure used for the preparation of Copolyester A except that the following ingredients and amounts are used.

| Ingredient | Parts |
| --- | --- |
| dimethyl terephthalate | 39.5 |
| dimethyl isophthalate | 11.4 |
| 1,4-butanediol | 35.0 |
| ethylene oxide-capped poly(propylene oxide) glycol, mol. wt. 2150, ethylene oxide content, 28% | 42.6 |
| 4,4'-bis(α,α-dimethylbenzyl) diphenylamine | 1.0 |
| trimethyl 1,2,4-benzene tricarboxylate | 0.2 |
| tetrabutyl titanate | 0.3 |

The resulting polymer has a melt index of about 5 g/10 min. at 190° C. The ratio of high melting point blocks to low melting point blocks in this polymer is 1:0.79.

Copolyester D is prepared by the procedure used for the preparation of Copolyester A except that the following ingredients and amounts are used.

| Ingredient | Parts |
| --- | --- |
| dimethyl terephthalate | 31.4 |
| dimethyl isophthalate | 9.1 |
| ethylene oxide-capped poly(propylene oxide) glycol mol. wt. 2150 ethylene oxide content, 28% | 55 |
| 1,4-butanediol | 24 |
| N,N'—hexamethylenebis(3,5-di-tert-butyl-4-hydroxy-hydrocinnamamide) | 0.2 |
| N,N'—trimethylenebis(3,5-di-tert-butyl-4-hydroxy-hydrocinnamamide) | 0.2 |
| bis(1,2,2,6,6-pentamethyl-4-piperidinyl)n-butyl(3,5-di-tert-butyl-4-hydroxy-benzyl)-malonate | 0.4 |
| trimethyl 1,2,4-benzene tricarboxylate | 0.4 |
| tetrabutyl titanate | 0.3 |

The resulting polymer has a melt index of about 10.9 g/10 min. at 190° C. The ratio of high melting point blocks to low melting point blocks in this polymer is 1:1.30.

Copolyester E is prepared by the procedure used for the preparation of Copolyester A except that the following ingredients and amounts are used.

| Ingredient | Parts |
| --- | --- |
| dimethyl terephthalate | 66.5 |
| poly(tetramethylene oxide) glycol(number average mol. wt. 1000) | 26.6 |
| 1,4-butanediol | 41.7 |
| N,N'—hexamethylenebis(3,5-di-tert-butyl-4-hydroxy-hydrocinnamamide) | 0.15 |
| N,N'—trimethylenebis(3,5-di-tert-butyl-4-hydroxy-hydrocinnamamide) | 0.15 |
| tetrabutyl titanate | 0.3 |

The resulting polymer has a melt index of about 9 g/10 min. at 230° C. The ratio of high melting point blocks to low melting point blocks in this polymer is 1:0.38.

Copolyester F is prepared by the procedure used for the preparation of Copolyester A except that the following ingredients and amounts are used.

| Ingredient | Parts |
| --- | --- |
| dimethyl terephthalate | 75 |
| poly(tetramethylene oxide) glycol(number average mol. wt. 1000) | 16 |
| 1,4-butanediol | 48 |
| N,N'—hexamethylenebis(3,5-di-tert-butyl-4-hydroxy-hydrocinnamamide) | 0.15 |
| N,N'—trimethylenebis(3,5-di-tert-butyl-4-hydroxy-hydrocinnamamide) | 0.15 |
| tetrabutyl titanate | 0.2 |

The resulting polymer has a melt index of about 12.5 g/10 min. at 240° C. The ratio of high melting point blocks to low melting point blocks in this polymer is 1:0.19.

Copolyester G is prepared by the procedure used for the preparation of Copolyester A except that the following ingredients and amounts are used.

| Ingredient | Parts |
| --- | --- |
| dimethyl terephthalate | 66 |
| poly(tetramethylene oxide) glycol(number average mol. wt. 1000) | 22.1 |
| 1,6-hexanediol | 17.5 |
| 1,4-butanediol | 25 |
| N,N'—hexamethylenebis(3,5-di-tert-butyl-4-hydroxy-hydrocinnamamide) | 0.15 |
| N,N'—trimethylenebis(3,5-di-tert-butyl-4-hydroxy-hydrocinnamamide) | 0.15 |
| tetrabutyl titanate | 0.2 |

The resulting polymer has a melt index of about 8.2 g/10 min. at 190° C. The ratio of high melting point blocks to low melting point blocks in this polymer is 1:0.30.

Arapahoe Smoke Chamber and Char Test

Measurement of Smoke and Char Generation by use of the Arapahoe Smoke Chamber, Model 705, Arapahoe Chemicals, Boulder, Colo. is as follows: 1½"×½"×⅛"[38.1×12.7×3.175 mm] molded sample of the thermoplastic copolyester composition is burned for 30 seconds in an airflow of 4.5 cfm (0.13 m³/min), using a calibrated propane burner. The smoke is collected on filter paper and weighed. The remaining char on the sample is removed and weighed. The percent smoke and percent char are calculated as follows.

$$\% \text{ Smoke} = \frac{\text{smoke wt}}{\text{total amount burned}} \times 100$$

$$\% \text{ Char} = \frac{\text{char wt}}{\text{total amount burned}} \times 100$$

The following ASTM methods are employed in determining the properties of the polymer compositions prepared in the examples which follow.

| | |
|---|---|
| Tensile strength and elongation at break, | D-412 |
| Trouser Tear Strength | D-470* |
| Melt flow index | D1238 |
| Torsional Modulus (Clash-Berg) | D1043 |
| Shore D hardness | D2240 |

*Modified by use of 3.8 × 7.6 cm sample with a 3.8 cm cut on the long axis of the sample to prevent necking down at the point of tearing. Tear rate is 127 cm/min.

The flammability characteristics are determined according to the vertical burning test of the Underwriters Laboratories, Inc., Standard UL 94, 1980. The UL 94 test was modified with reference to the conditioning of specimens. The modified specimen conditioning is as follows: set of five specimens in a circulating air oven for 2 hours at 100° C., then cooled in a dessicator over anhydrous calcium chloride for 2 hours at room temperature prior to testing. The V-O classification indicates a higher degree of flame retardance than does a V-2 classification.

Organophilic clay is the reaction product of bentonite with a mixture of 83% by weight of dimethyl di(hydrogenated tallow) ammonium chloride and 17% by weight methyl benzyl di(hydrogenated tallow) ammonium chloride. The organophilic clay contains 60% by weight of non-volatiles at about 700° C. by thermogravimetric analysis.

Fumed colloidal silica is Cabosil ® S-17.

Polytetrafluoroethylene is a dispersion produced powder.

EXAMPLE 1

A flame retardant, low percent smoke generating, high percent char composition is prepared from the ingredients and amounts listed in the following table:

| Ingredient | Parts By Weight |
|---|---|
| Copolyester A | 100 |
| N,N'—ethylenebis(tetrabromophthalimide) | 25 |
| Antimony trioxide (Laurel Fireshield ® Ultrafine II) | 12.5 |
| Organophilic clay (Average Particle Diameter, 44 micrometers) | 5 |
| Alumina trihydrate (Average Particle Diameter, 1.1 micrometers) | 20 |
| Calcium carbonate (Average Particle Diameter, 3.0 micrometers) | 20 |

The materials are dry blended and the dry blend is compounded on a Brabender Prep Center, a batch sigma blade mixer, heated to about 200° C. The composition is granulated and compression molded at 200° C. Test specimens of 127 mm×12.7 mm×1.6 mm (5"×½"×1/16") and 127 mm 12.7 mm×0.8 mm (5"×½"×1/32") are prepared by compression molding. Test results at specimen thickness of 1.6 mm and 0.8 mm by the modified UL-94 test, described above, indicate the composition is V-O and significantly does not drip during burning after either ignition. Additionally, the specimens unexpectedly show reduced smoke generation and increased char formation relative to unmodified comparative flame retardant Copolyester A that is the same as the composition of Example 1 except that it does not contain alumina trihydrate and calcium carbonate.

| | Properties | |
|---|---|---|
| Stress/Strain at 23° C. | Composition of Example 1 | Comparative Flame Retardant Copolyester A |
| Modulus at 10%, MPa | 6.72 | 6.38 |
| Modulus at 100%, MPa | 8.45 | 8.97 |
| Modulus at 200%, MPa | 8.45 | 8.79 |
| Modulus at 300%, MPa | 8.62 | 8.97 |
| Tensile Strength, MPa | 8.62 | 9.57 |
| Elongation at Break, % | 350 | 500 |
| Trouser Tear Srength, kN/m | 67.9 | 55.3 |
| Melt Flow Index, g/10 min. at 190° C. | 2.8 | 3.0 |
| Shore D Hardness | 49 | 47 |
| Arapahoe Smoke Chamber and Char Test | | |
| % Smoke | 7.4 | 9.4 |
| % Char | 22.7 | 11.7 |
| UL-94 (Modified) | | |
| 1.6 mm thickness | V-O | V-O |
| 0.96 mm thickness | V-O | V-O |
| Torsional Modulus (Clash-Berg) MPa | | |
| 23° C. | 39.8 | 41.8 |
| −30° C. | 80.8 | 83.6 |

EXAMPLE 2

Flame retardant compositions are prepared from the ingredients and amounts shown in the following table:

| | Parts By Weight | | | | | |
|---|---|---|---|---|---|---|
| Ingredients | 2A | 2B | 2C | 2D | 2E | 2F |
| Copolyester C | 100 | 100 | 100 | 100 | 100 | 100 |
| N,N'—ethylenebis (tetrabromophthalimide) | 25 | 25 | 25 | 25 | 25 | 25 |
| Antimony trioxide | 12.5 | 12.5 | 12.5 | 12.5 | 12.5 | 12.5 |
| Organophilic clay | 5 | 5 | 5 | 5 | 5 | 5 |
| Alumina trihydrate | 20 | 20 | 40 | 40 | 40 | 60 |
| Calcium carbonate | 20 | 40 | 20 | 40 | 60 | 60 |

The ingredients are mixed in a heated sigma blade mixer as described in Example 1. Test specimens are prepared as in Example 1 at 200° C. and are classified as V-O by the modified UL-94 test described above. The specimens do not drip while burning.

|  | Properties | | | | | |
|---|---|---|---|---|---|---|
| Stress-Strain at 23° C. | 2A | 2B | 2C | 2D | 2E | 2F |
| Modulus at 10%, MPa | 4.52 | 7.31 | 8.00 | | | |
| Tensile Strength, MPa | 10.35 | 10.69 | 11.03 | | | |
| Elongation at Break, % | 15 | 25 | 15 | | | |
| Trouser Tear Strength, kN/m | 17.5 | 16.1 | 13.7 | | | |
| Melt Flow Index, g/10 min. at 190° C. | 0.38 | 1.1 | 1.4 | 1.3 | 0.84 | 1.04 |
| Shore D Hardness | 51 | 53 | 53 | — | — | — |
| Arapahoe Smoke Chamber and Char Test | | | | | | |
| % Smoke | 9.2 | 5.6 | 7.0 | 5.0 | 6.6 | 4.9 |
| % Char | 26.3 | 36.4 | 31.6 | 36.2 | 36.0 | 41.8 |
| UL-94 (modified) | | | | | | |
| 1.6 mm thick | V-O | V-O | V-O | — | — | — |
| 0.8 mm thick | V-O | V-O | V-O | — | — | — |
| Torsional Modulus (Clash-Berg) MPa | | | | | | |
| 23° C. | 36.8 | 42.7 | 29.5 | — | — | — |
| −15° C. | 73.6 | — | — | — | — | — |
| −20° C. | — | 107 | 62.8 | — | — | — |
| −30° C. | — | — | 80.3 | — | — | — |

EXAMPLE 3

Flame retardant compositions are prepared from the ingredients and amounts shown in the following table:

|  | Parts By Weight | | | | | |
|---|---|---|---|---|---|---|
| Ingredients | A* | B | C* | D | E* | F |
| Copolyester A | 100 | 100 | — | — | — | — |
| Copolyester D | — | — | 100 | 100 | — | — |
| Copolyester F | — | — | — | — | 100 | 100 |
| N,N—ethylene bis (tetrabromophthalimide) | 25 | 25 | 25 | 25 | 25 | 25 |
| Antimony trioxide | 12.5 | 12.5 | 12.5 | 12.5 | 12.5 | 12.5 |
| Organophilic clay | 5.0 | 5.0 | 5.0 | 5.0 | 5.0 | 5.0 |
| Alumina trihydrate | — | 20.0 | — | 20.0 | — | 20.0 |
| Calcium carbonate | — | 40.0 | — | 40.0 | — | 40.0 |
| Stearic acid | — | 1.0 | — | 1.0 | — | 1.0 |

*A, C and E are comparative examples.

The ingredients are mixed in a heated sigma blade mixer as described in Example 1. Test specimens are prepared as in Example 1 at 200° C. The specimens do not drip while burning.

|  | Properties | | | | | |
|---|---|---|---|---|---|---|
| Melt Flow Index, | | | | | | |
| 10 min. at 190° C. | 6.02 | 4.1 | 8.86 | 6.08 | — | — |
| 10 min. at 240° C. | — | — | — | — | 23.6 | 20.5 |
| Arapahoe Smoke Chamber and Char Test | | | | | | |
| % Smoke | 10.8, 6.1 | 12.3, 7.6, 4.0(a) | 7.7, 7.9 | 7.5, 6.9 | 14.5, 14.4 | 9.2, 10.1 |
| % Char | 4.4, 1.2 | 28.1, 22.9, 32.9(a) | 3.7, 3.7 | 18.6, 24.9 | 8.5, 8.0 | 23.2, 18.3 |
| UL-94 (modified) | | | | | | |
| 0.96 mm thickness | V-O | V-O | V-O | V-O | V-O | V-O |
| 1.6 mm thickness | V-O | V-O | V-O | V-O | V-O | V-O |

(a)Since Example 3B gave poor reproducibility it was scaled up to about 650 kg scale using a Farrell Continuous Mixer. The percent smoke was 6.8 and the percent char was 30.7.

EXAMPLE 4

Flame retardant compositions are prepared from the ingredients and amounts shown in the following table.

|  | Parts By Weight | | | | | |
|---|---|---|---|---|---|---|
| Ingredients | A* | B | C | D | E* | F |
| Copolyester G | 100 | 100 | — | — | — | — |
| Copolyester A | — | — | 100 | 100 | — | — |
| Copolyester E | — | — | — | — | 100 | 100 |
| N,N—ethylenebis (tetrabromophthalimide) | 25 | 25 | 25 | 25 | 25 | 25 |
| Antimony trioxide | 12.5 | 12.5 | 12.5 | 12.5 | 12.5 | 12.5 |
| Organophilic clay | 5.0 | 5.0 | 5.0 | 5.0 | 5.0 | 5.0 |
| Alumina trihydrate | — | 20.0 | 6.0 | 54.0 | — | 20.0 |
| Calcium carbonate | — | 40.0 | 54.0 | 6.0 | — | 40.0 |
| Stearic acid | — | 1.0 | 1.0 | 1.0 | — | 1.0 |

*A and E are comparative examples.

The ingredients are mixed in a heated sigma blade mixer as described in Example 1. Test specimens are prepared as in Example 1 at 200° C. The specimens do not drip while burning.

|  | Properties | | | | | |
|---|---|---|---|---|---|---|
| Melt Flow Index, | | | | | | |
| g/10 min. at 190° C. | 2.47 | 1.58 | 1.96 | 1.25 | — | — |
| g/10 min. at 230° C. | — | — | — | — | 0.55 | 0.44 |
| Arapahoe Smoke Chamber and Char Test | | | | | | |
| % Smoke | 14.3, 13.6 | 8.0, 9.8 | 7.3, 5.6 | 5.1, 5.8 | 10.2, 9.4 | 6.4, 6.9 |
| % Char | 8.9, 9.0 | 30.4, 35.7 | 22.5, 22.6 | 27.9, 26.8 | 6.5, 5.8 | 23.9, 26.8 |

EXAMPLE 5

Flame retardant compositions are prepared from the ingredients and amounts shown in the following table.

|  | Parts By Weight | | |
|---|---|---|---|
| Ingredients | A | B | C |
| Copolyester C | 100 | 100 | 100 |
| Dodecachloro dodecahydro dimethanedibenzocyclooctane | 35 | — | 35 |
| Occidental HRS 3096* | — | 35 | — |
| Antimony oxide | 12.5 | 12.5 | 12.5 |
| Organophilic clay | 5 | 5 | 5 |
| Alumina trihydrate | 20 | 20 | 20 |
| Calcium carbonate | 40 | 40 | 40 |
| Stearic acid | 1 | 1 | 1 |

The ingredients are mixed in a heated sigma blade mixer as described in Example 1. Test specimens are prepared as in Example 1 at 200° C. The specimens do not drip while burning.

|  | Properties | | |
|---|---|---|---|
| Melt Flow Index [g/10 min. at 190° C.] | 2.8 | 2.3 | 2.6 |
| Arapahoe Smoke Chamber and Char Test | | | |
| % Smoke | 5.2 | 5.4 | 5.2 |
| % Char | 25 | 26.1 | 27.5 |
| UL94 Rating | V-O | V-O | V-O |

*HRS 3096: 2,2'(1,2 ethanediol)bis [hexachloro tetrahydro [9C Diol)] 4,7-methanol-1H-isoendo-1,3(2H)-dione

EXAMPLE 6

Flame retardant compositions are prepared from the ingredients and amounts shown in the following table.

|  | Parts By Weight | | | | | |
| --- | --- | --- | --- | --- | --- | --- |
| Ingredients | A | B | C | D | E | F |
| Copolyester A | 100 | 100 | 100 | 100 | 100 | 100 |
| N,N'—ethylenebis(tetra-bromophthalimide) | 25 | 25 | 25 | 12 | 12 | 6 |
| Antimony oxide | 12.5 | 12.5 | 12.5 | 6 | 6 | 6 |
| Alumina trihydrate[1] | — | — | 30 | 50 | 40 | 50 |
| Alumina trihydrate[2] | 40 | 60 | 30 | — | — | — |
| Calcium carbonate | 20 | — | — | 25 | 20 | 20 |
| Organophilic clay | 5 | 5 | 5 | 5 | 5 | 5 |
| Stearic acid | 1.0 | 1.0 | 1.0 | 1.0 | 1.0 | 1.0 |

The ingredients are mixed in a heated sigma blade mixer as described in Example 1. Test specimens are prepared as in Example 1 at 200° C. The specimens do not drip when burned.

|  | Properties | | | | | |
| --- | --- | --- | --- | --- | --- | --- |
| Melt Flow Index [g/10 min. at 190° C.] | 2.0 | 2.8 | 2.5 | 2.5 | 3.1 | 2.5 |
| Arapahoe Smoke Chamber and Char Test | | | | | | |
| % Smoke | 3.4 | 4.3 | 4.8 | 2.3 | 3.1 | 2.5 |
| % Char | 36.2 | 23.8 | 22.1 | 32.2 | 28.7 | 30.6 |
| UL94 Rating | V-O | V-O | V-O | V-O | V-O | V-O |

(1) Particle size, 40 microns
(2) Particle size, 11 microns

EXAMPLE 7

Flame retardant compositions are prepared from the indredients and amounts shown in the following table.

|  | Parts By Weight | |
| --- | --- | --- |
| Ingredients | A | B* |
| Copolyester A | 100 | 100 |
| N,N'—ethylenebis (tetrabromophthalimide) | 25 | 25 |
| Antimony oxide | 13 | 13 |
| Fumed colloidal silica | 5 | 5 |
| Alumina trihydrate | 20 | — |
| Calcium carbonate | 40 | — |
| Stearic acid | 1.0 | — |

*B is a comparative example

The ingredients are mixed in a heated sigma blade mixer as described in Example 1. Test specimens are prepared as in Example 1 at 200° C.

|  | Properties | |
| --- | --- | --- |
| Melt Flow Index g/10 min. at 190° C. | 3.0 | 5.7 |
| Arapahoe Smoke Chamber and Char Test | | |
| % Smoke | 6.2 | 8.9 |
| % Char | 26.8 | 7.8 |

EXAMPLE 8

Flame retardant compositions are prepared from the ingredients and amounts shown in the following table.

| Ingredients | Parts By Weight |
| --- | --- |
| Copolyester B | 100 |
| N,N'—ethylenebis (tetrabromophthalimide) | 25 |
| Antimony oxide | 12.5 |
| Organophilic clay | 5 |
| Alumina trihydrate | 20 |
| Calcium carbonate | 40 |
| Stearic acid | 1 |

The ingredients are mixed in a heated sigma blade mixer as described in Example 1. Test specimens are prepared as in Example 1 at 200° C.

| Properties | |
| --- | --- |
| Melt Flow Index g/10 min. at 220° C. | 2 |
| Arapahoe Smoke Chamber and Char Test | |
| % Smoke | 8.9 |
| % Char | 21.2 |

EXAMPLE 9

Flame retardant compositions are prepared from the ingredients and amounts shown in the following table.

|  | Parts By Weight | |
| --- | --- | --- |
| Ingredients | A | B* |
| Copolyester G | 100 | 100 |
| Poly(tetrabromobisphenol A Carbonate) | 31 | 31 |
| Antimony oxide | 9.8 | 9.8 |
| Polytetrafluoroethylene | 0.5 | 0.5 |
| Alumina trihydrate | 21.2 | — |
| Calcium carbonate | 42.4 | — |
| Stearic acid | 1.1 | — |

*B is a comparative example

The ingredients are mixed in a heated sigma blade mixer as described in Example 1. Test specimens are prepared as in Example 1 at 200° C.

| Properties | | |
| --- | --- | --- |
| Melt Flow Index g/10 min. at 190° C. | 4.2 | 7.3 |
| Arapahoe Smoke Chamber and Char Test | | |
| % Smoke | 8 | 11.2 |
| % Char | 14.2 | 3.4 |

EXAMPLE 10

A bundle of 25 pairs of 24 gauge copper wires each insulated with 0.14–0.15 mm of tetrafluoroethylene-hexafluoropropylene copolymer [Du Pont Teflon ®FEP] was extrusion jacketed with 0.25 mm of the composition of Example 3B. A second sample was also prepared in which Copolyester C was substituted for Copolyester A in the jacketing composition. The jacketed cables were tested in accordance with Underwriters' Laboratory UL-910 "Test Method for Fire and Smoke Characteristics of Electrical and Optical Fiber Cables used in Air-Handling Spaces", using the UL Steiner Tunnel. The results are given below.

| Sample | Maximum Flame Propagation Distance | | Optical Density | |
| --- | --- | --- | --- | --- |
| | Feet | Meters | Peak | Average |
| Cable with Example 3B | 3.5 | 1.067 | 0.38 | 0.10 |
| Cable with Example 2B | 3.5 | 1.067 | 0.34 | 0.11 |
| Maximum Values For Passing Test | 5.0 | 1.524 | 0.50 | 0.15 |

The two experimental cable samples passed the Steiner Tunnel test in all respects.

I claim:

1. A substantially nondripping, low smoke generating, high char forming, flame retardant thermoplastic copolyester composition which comprises (a) a multi-block copolyester of film forming molecular weight consisting essentially of (A) repeating high melting point blocks comprising repeating short chain ester units having the formula

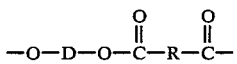

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting point blocks which are derived from compounds containing hydroxyl groups or carboxyl groups or mixtures thereof and having a number average molecular weight of 400–4000 and a melting point not greater than about 100° C., and (C) an amount of difunctional radicals sufficient to join repeating blocks (A) and (B) to form a multi-block copolyester, the weight ratio of (A) to (B) being from about 1:0.12 to 1:4, (b) about 5–35 parts per 100 parts of said multi-block copolyester of a bromine- or chlorine-containing flame retardant containing at least 50% by weight bromine or chlorine, (c) about 0.20–1.5 parts per part of said bromine- or chlorine-containing flame retardant of antimony trioxide, and (d) a drip suppressant selected from (1) at least about 1 part per 100 parts of said multi-block copolyester of an organophilic clay which is the reaction product of at least one quaternary ammonium salt with a smectite clay having an ion exchange capacity of at least 75 meq/100 g of clay, said quaternary ammonium salt having the formula

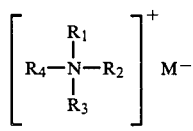

wherein $M^-$ is selected from the group consisting of chloride, bromide, iodide, nitrite, hydroxide, acetate, methyl sulfate and mixtures thereof, wherein $R_1$ is an alkyl group having 12–22 carbon atoms and wherein $R_2$, $R_3$ and $R_4$ are selected from the group consisting of hydrogen, alkyl groups containing 1–22 carbon atoms, aryl groups and aralkyl groups containing 1–22 carbon atoms in the alkyl chain, (2) at least about 2 parts per 100 parts of said multi-block copolyester of fumed colloidal silica, or (3) at least about 0.2 parts per 100 parts of said multi-block copolyester of polytetrafluoroethylene, (e) about 5–100 parts per 100 parts of said multi-block copolyester of alumina trihydrate, and (f) up to about 100 parts per 100 parts multi-block copolyester of calcium carbonate, with the proviso that the total amount of (e) and (f) is less than about 140 parts per 100 parts multi-block copolyester.

2. A thermoplastic composition of claim 1 wherein the copolyester contains 5–60 parts per 100 parts multi-block copolyester of alumina trihydrate.

3. A thermoplastic composition of claims 1 or 2 wherein the copolyester contains 5–60 parts per 100 parts multi-block copolyester of calcium carbonate.

4. A thermoplastic composition of claim 1 wherein the total amount of components (e) and (f) is less than about 80 parts per 100 parts multi-block copolyester.

5. A thermoplastic composition of claim 1 wherein the repeating high melting point blocks are derived from ethylene glycol or 1,4-butanediol and terephthalic acid or mixtures thereof containing up to about 30% by weight isophthalic acid or phthalic acid.

6. A thermoplastic composition of claim 1 wherein the repeating low melting point blocks are derived from poly(alkylene oxide) glycols having a carbon to oxygen atomic ratio of about 2.0–4.3 and a number average molecular weight of about 400–4000.

7. A thermoplastic composition of claim 6 wherein the poly(alkylene oxide) glycol is poly(tetramethylene oxide) glycol having a number average molecular weight of 600–2000.

8. A thermoplastic composition of claim 6 wherein the poly(alkylene oxide) glycol is ethylene-oxide capped poly(propylene oxide) glycol having a number average molecular weight of 1500–2800 and an ethylene oxide content of 15–35% by weight.

9. A thermoplastic composition of claim 1 wherein the repeating low melting point blocks are derived from polyester glycols.

10. A thermoplastic composition of claim 1 wherein the bromine-containing flame retardant is N,N'-ethylenebis(tetrabromophthalimide).

11. A thermoplastic composition of claim 1 wherein the organophilic clay is the reaction product of bentonite clay with a mixture of 10–90% by weight dimethyl benzyl (hydrogenated tallow) ammonium chloride and 10–90% by weight dimethyl di(hydrogenated tallow) ammonium chloride.

12. A thermoplastic composition of claim 1 wherein the multi-block copolyester consists essentially of high melting point blocks derived from 1,4-butanediol and a mixture of terephthalic acid and isophthalic acid or esters thereof, and low melting point blocks derived from poly(tetramethylene oxide) glycol having a number average molecular weight of about 800–1200, the weight ratio of high melting point blocks to low melting point blocks being from 1–0.5 to 1:3, about 5–35 parts of N,N'-ethylenebis(tetrabromophthalimide), and about 0.3-0.6 parts per part of said bromine-containing flame retardant of antimony trioxide and about 2-10 parts per 100 parts of said multi-block copolyester of an organophilic clay which is the reaction product of bentonite clay with a mixture of 10-90% by weight dimethyl benzyl(hydrogenated tallow) and 10-90% by weight dimethyl di(hydrogenated tallow) ammonium chloride or 3-20 parts per 100 parts of said multi-block copolyester of fumed colloidal silica or 0.2-2 parts per 100 parts of said multi-block copolyester of polytetrafluoroethylene.

13. A thermoplastic composition of claim 1 wherein the drip suppressant is organophilic clay in an amount of about 2-10 parts per 100 parts multi-block copolyester.

14. A substantially nondripping, low smoke generating, high char forming, flame retardant thermophastic copolyester composition which comprises
  (a) a multi-block copolyester of film forming molecular weight consisting essentially of (A) repeating high melting point blocks comprising repeating short chain ester units having the formula

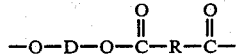

wherein D is a divalent radical remaining after the removal of hydroxyl groups from a low molecular weight diol having a molecular weight not greater than 250 and R is divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting point blocks which are derived from compounds containing hydroxyl groups or carboxyl groups or mixtures thereof and having a number average molecular weight of 400-4000 and a melting point not greater than about 100° C., and (C) an amount of difunctional radicals sufficient to join repeating blocks (A) and (B) to form a multi-block copolyester, the weight ratio of (A) to (B) being from about 1:0.12 to 1:4,
  (b) about 5-35 parts per 100 parts of said multi-block copolyester of a bromine-or chlorine-containing flame retardant containing at least 50% by weight bromine or chlorine,
  (c) about 0.20-1.5 parts per part of said bromine- or chlorine-containing flame retardant of antimony trioxide, and
  (d) at least about 2 parts per 100 parts of said multi-block copolyester of fumed colloidal silica,
  (e) about 5-100 parts per 100 parts of said multi-block copolyester of alumina trihyrate, and
  (f) up to about 100 parts per 100 parts multi-block copolyester of calcium carbonate,
    with the proviso that the total amount of (e) and (f) is less than about 140 parts per 100 parts multi-block copolyester.

15. A substantially nondripping, low smoke generating, high char forming, flame retardant thermoplastic copolyester composition which comprises
  (a) a multi-block copolyester of film forming molecular weight consisting essentially of (A) repeating high melting point blocks comprising repeating short chain ester units having the formula

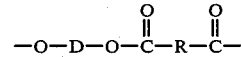

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting point blocks which are derived from compounds containing hydroxyl groups or carboxyl groups or mixtures thereof and having a number average molecular weight of 400-4000 and a melting point not greater than about 100° C., and (C) an amount of difunctional radicals sufficient to join repeating blocks (A) and (B) to form a multi-block copolyester, the weight ratio of (A) to (B) being from about 1:0.12 to 1:4,
  (b) about 5-35 parts per 100 parts of said multi-block copolyester of a bromine-or chlorine-containing flame retardant containing at least 50% by weight bromine or chlorine,
  (c) about 0.20-1.5 parts per part of said bromine- or chlorine-containing flame retardant of antimony trioxide, and
  (d) at least about 0.2 parts per 100 parts of said multi-block copolyester of polytetrafluoroethylene,
  (e) about 5-100 parts per 100 parts of said multi-block copolyester of alumina trihydrate, and
  (f) up to about 100 parts per 100 parts multi-block copolyester of calcium carbonate,
    with the proviso that that total amount of (e) and (f) is less than about 140 parts per 100 parts multi-block copolyester.

* * * * *